US010885320B2

(12) United States Patent
Rangarajan et al.

(10) Patent No.: US 10,885,320 B2
(45) Date of Patent: Jan. 5, 2021

(54) ENHANCED ACCESSIBILITY IN MIXED REALITY EXPERIENCE FOR COLLABORATION TOOLS

(71) Applicant: Microsoft Technology Licensing, LLC, Redmond, WA (US)

(72) Inventors: Rajesh Rangarajan, Redmond, WA (US); Shen Vikul Chauhan, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 267 days.

(21) Appl. No.: 15/970,082

(22) Filed: May 3, 2018

(65) Prior Publication Data
US 2019/0340426 A1 Nov. 7, 2019

(51) Int. Cl.
*G06K 9/00* (2006.01)
*G06F 3/01* (2006.01)
*G06K 9/62* (2006.01)
*G06T 19/00* (2011.01)

(52) U.S. Cl.
CPC ......... *G06K 9/00355* (2013.01); *G06F 3/017* (2013.01); *G06K 9/6218* (2013.01); *G06T 19/006* (2013.01)

(58) Field of Classification Search
CPC ........ G06F 3/017; G06F 3/011; G06F 3/0304; G06N 20/00; G06K 9/00355; G06K 9/00; G06K 9/62; G06K 2209/00; G06T 7/00

USPC ............ 382/181, 154, 203; 345/633, 8, 467; 715/863; 704/9
See application file for complete search history.

(56) References Cited

U.S. PATENT DOCUMENTS

| | | | |
|---|---|---|---|
| 2009/0058860 A1* | 3/2009 | Fong | G06F 40/20 345/467 |
| 2013/0336524 A1 | 12/2013 | Zhang et al. | |
| 2014/0316763 A1 | 10/2014 | Tardif | |
| 2018/0075659 A1 | 3/2018 | Browy et al. | |
| 2018/0107962 A1* | 4/2018 | Lundin | G06Q 10/06398 |
| 2018/0149884 A1* | 5/2018 | Miller | G02C 7/04 |

OTHER PUBLICATIONS

Fang, et al., "DeepASL: Enabling Ubiquitous and Non-Intrusive Word and Sentence-Level Sign Language Translation", In Proceedings of 15th ACM Conference on Embedded Network Sensor Systems, Nov. 6, 2017, 13 Pages.
(Continued)

*Primary Examiner* — Charlotte M Baker
(74) *Attorney, Agent, or Firm* — Rainier Patents, P.S.

(57) ABSTRACT

Described herein is are systems and methods for interpreting gesture(s) and/or sign(s) using a machine-learned model. Information regarding gesture(s) and/or sign(s) is received from a first user. The information can be received via a mixed reality device of the first user and/or a second user. Probabilities that the gesture(s) or sign(s) have particular meanings are calculated using a machine-trained model. The gesture(s) and/or sign(s) are interpreted in accordance with the calculated probabilities. Information regarding the interpreted gesture(s) and/or sign(s) are provided (e.g., displayed as visual text and/or an audible output) to the second user.

20 Claims, 6 Drawing Sheets

(56) References Cited

OTHER PUBLICATIONS

Rogers, Kaleigh, "Augmented Reality App Can Translate Sign Language Into Spoken English, and Vice Versa—Vice", Retrieved From: https://www.vice.com/en_us/article/zmgnd9/app-to-translate-sign-language, Mar. 27, 2018, 15 Pages.

Turchi, et al., "Adaptive Quality Estimation for Machine Translation Antonios Anastasopoulos", In Proceedings of 52nd Annual Meeting of the Association for Computational Linguistics, vol. 1, Jun. 25, 2014, pp. 710-720.

"International Search Report and Written Opinion Issued in PCT Application No. PCT/US2019/028253", dated Jul. 19, 2019, 15 Pages.

Huang, Jie, et al., "Video-based Sign Language Recognition without Temporal Segmentation", 32nd AAAI Conference on Artificial Intelligence, Feb. 2-7, 2018, New Orleans, Louisiana, 8 pages.

* cited by examiner

ENHANCED ACCESSIBILITY IN MIXED REALITY EXPERIENCE FOR COLLABORATION TOOLS

BACKGROUND

While American Sign Language (ASL) is the dominant sign language of the United States, there is no globally accepted standardized sign language. It can be frustrating for a hearing-impaired person to attempt to communicate with others who are not fluent in interpreting sign language.

SUMMARY

Described herein is a system for interpreting a gesture or a sign using a machine-learned model, comprising: a computer comprising a processor and a memory having computer-executable instructions stored thereupon which, when executed by the processor, cause the computer to: receive information regarding at least one of a gesture or a sign from a first user, the information received via a mixed reality device; calculate probabilities that the at least one of the gesture or the sign has particular meanings using a machine-trained model; interpret the at least one of the gesture or the sign in accordance with the calculated probabilities; and provide information regarding the interpreted at least one of the gesture or the sign to a second user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
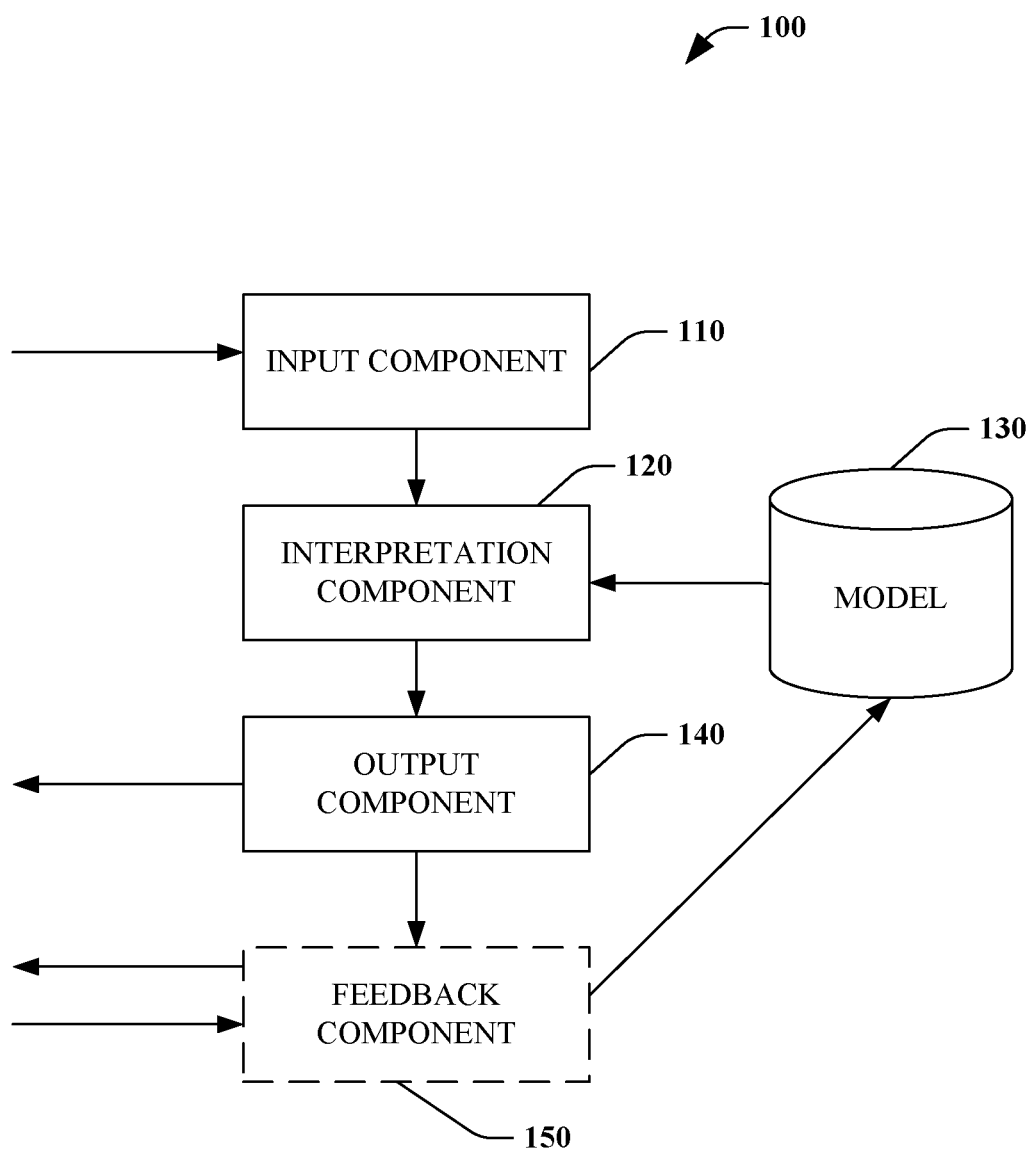
FIG. 1 is a functional block diagram that illustrates a system for interpreting gesture(s) and/or sign(s) using a machine-learned model.

Various technologies pertaining to translation and interpretation of gestures using a machine-learned model in a mixed reality experience are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

The subject disclosure supports various products and processes that perform, or are configured to perform, various actions regarding translation and interpretation of gestures using a machine-learned model in a mixed reality experience. What follows are one or more exemplary systems and methods.

Aspects of the subject disclosure pertain to the technical problem of translating and/or interpreting of gestures. The technical features associated with addressing this problem involve receiving information regarding at least one of a gesture or a sign from a first user, the information received via a mixed reality device; calculating probabilities that the at least one of the gesture or the sign has particular meanings using a machine-trained model; interpreting the at least one of the gesture or the sign in accordance with the calculated probabilities; and providing information regarding the interpreted at least one of the gesture or the sign to a second user (e.g., visually displaying text and/or providing audio output). Accordingly, aspects of these technical features exhibit technical effects of more efficiently and effectively reducing computer communication bandwidth consumption since, in some embodiments, the processing can occur local to a mixed reality device.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system," as well as various forms thereof (e.g., components, systems, sub-systems, etc.) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. Further, as used herein, the term "exemplary" is intended to mean serving as an illustration or example of something, and is not intended to indicate a preference.

"Sign language" is a language which uses visually transmitted gestures or signs to convey meaning. This can include simultaneous combinations of hand shapes, orientation and movement of the hands, arms or body and/or facial expressions to express a person's thoughts. Sign language may include spatial grammars which are different from the grammars of spoken languages. Hundreds of sign languages are in use around the world. American Sign Language (or ASL) is the dominant sign language of the United States. In ASL, finger spelling is used primarily for proper nouns, for emphasis (for example, finger spelling STOP is more emphatic than signing stop), for clarity, and for instruction.

ASL includes both finger spelling borrowings from English, as well as the incorporation of alphabetic letters from English words into ASL signs to distinguish related meanings of what would otherwise be covered by a single sign in ASL. For example, the signs for "class" and "family" are the same (a basic sign for "group of people). "Class" is signed with a "C" handshape and "family" is signed with an "F" handshape. Such signs are often referred to as "initialized" signs because they substitute the first letter (the initial) of the corresponding English word as the handshape in order to provide a more specific meaning.

When using alphabetic letters in these ways, several otherwise non-phonemic hand shapes become distinctive. For example, outside finger spelling there is but a single first hand shape the placement of the thumb is irrelevant. However, within finger spelling, the position of the thumb on the first distinguishes the letters A, S, and T. Letter-incorporated signs which rely on such minor distinctions as thumb position tend not to be stable in the long run, but they may eventually create new distinctions in the language.

Referring to FIG. 1, a system for interpreting gesture(s) and/or sign(s) using a machine-learned model 100 is illustrated. The system 100 can be used to translate and interpret gesture(s) and/or sign(s) received from a user.

In some embodiments, the system 100 can be a component of a real-time collaboration tool (e.g., Skype®). For example, the user can visually transmit gesture(s) and/or sign(s) to convey meaning, with the system 100 interpreting the gesture(s) and/or sign(s) and providing information regarding the interpreted gesture(s) and/or sign(s) (e.g., textually and/or audibly via the mixed reality device) to one or more other users.

In some embodiments, in order to reduce latency and/or maintain communication privacy, the system 100 can be a component of (e.g., local to) a mixed reality device (e.g., HoloLens®) and/or augmented reality device. In some embodiments, the system 100 can receive information regarding gesture(s) and/or sign(s) of a first user wearing the mixed reality device. In some embodiments, the system 100 can receive information regarding gesture(s) and/or signed (s) from the first user in physical proximity to a second user wearing the mixed reality device.

In real-time, the system 100 can utilize a machine-learned model to interpret the gesture(s) and/or sign(s). Information regarding the interpreted gesture(s) and/or sign(s) can be provided (e.g., displayed as text and/or output audibly) in real-time to the second user, for example, from a mixed reality device of the first user (person transmitting the sign(s)/gesture(s)) and/or from a mixed reality device worn by the second user.

The system 100 includes an input component 110 that receives information regarding gesture(s) and/or sign(s) from a first user. In some embodiments, the information is received from a mixed-reality device (e.g., Microsoft HoloLens®) worn by the first user and/or a mixed-reality device worn by a second user. In some embodiments, the information is received from a device that receives video/pictures such as Microsoft Kinect® depth camera, a gaming system and the like. In some embodiments, the information can be received from precision sensor(s), z-index sensor(s), and/or depth sensor(s) employing x-ray beam(s), laser, ultrasound and the like. In some embodiments, the information can be received from digital camera(s), three-dimensional camera (s), movement detector(s), (s) and the like.

The system 100 further includes an interpretation component 120 that calculates probabilities that the gesture(s) and/or sign(s) have particular meanings using a model 130.

The calculated probabilities are then used by the interpretation component 120 to interpret the gesture(s) and/or sign(s). In some embodiments, the interpretation component 120 utilizes the particular meaning having the highest calculated probability. In some embodiments, the interpretation component 120 utilizes a predetermined quantity of particular meanings ranked according to calculated probability (e.g., top two). In some embodiments, the interpretation component 120 utilizes particular meaning(s) having a calculated probability greater than a predetermined threshold (e.g., greater than 95%).

In some embodiments, the model 130 can be trained using a machine learning process that takes utilizes various features present in a particular sign language with the model representing an association among the features. In some embodiments, the model 130 is trained using one or more machine learning algorithms including linear regression algorithms, logistic regression algorithms, decision tree algorithms, support vector machine (SVM) algorithms, Naive Bayes algorithms, a K-nearest neighbors (KNN) algorithm, a K-means algorithm, a random forest algorithm, dimensionality reduction algorithms, Artificial Neural Network (ANN) and/or a Gradient Boost & Adaboost algorithm.

In some embodiments, the model 130 can be a classifier trained to recognize gestures, signs, sequences, and/or combinations thereof of a particular sign language, as discussed below. In some embodiments, the model 130 can be trained using a clustering algorithm (e.g., unsupervised learning). Once trained the model 130 can be utilized by the system 100 to facilitate interpretation of received gesture(s) and/or sign(s).

In some embodiments, the model 130 is trained to interpret gesture(s) and/or sign(s) for a particular sign language. In some embodiments, the model 130 can further be trained to interpret gesture(s) and/or sign(s) for the particular sign language for a particular user. In some embodiments, the model 130 can be further trained to interpret gesture(s) and/or sign(s) for the particular language for a group of users (e.g., in a privacy-preserving manner such that personally identifiable information is not stored by the model 130).

In some embodiments, the interpretation component 120 interprets the gesture(s) and/or sign(s) based upon previous gesture(s) and/or sign(s). In some embodiments, the interpretation component 120 interprets the gesture(s) and/or sign(s) based upon subsequently received gesture(s) and/or sign(s). For example, the interpretation component 120 can temporarily buffer a plurality of gesture(s) and/or sign(s) and calculate probabilities that each of the gesture(s) and/or sign(s) have a particular meaning in the context of the buffered gesture(s) and/or sign(s) (e.g., the model 130 further applying a linguistic algorithm).

In some embodiments, the interpretation component 120 can further translate the interpreted gesture(s) and/or sign(s) to one or more target spoken and/or written languages (e.g., English, Spanish) using the model 130. For example, the interpretation component 120 can map interpreted gesture(s) and/or sign(s) to word(s), phrase(s), and/or sentence(s) in the target language(s).

The system 100 also includes an output component 140 that provides information regarding the interpreted gesture(s) and/or sign(s) (e.g., in real-time). In some embodiments, the interpretation component 120 provides a translation which can then form the basis of the information provided by the output component 140. In some embodiments, the information is provided in audio format to one or more other users. In some embodiments, the information is provided in textual format to one or more other users.

In some embodiments, the information regarding the interpreted gesture(s) and/or sign(s) is provided to the second user via a mixed reality device worn by the second user. In some embodiments, the information regarding the interpreted gesture(s) and/or sign(s) is provided to the second user via a display and/or speaker system local to the second user. For example, the information regarding gesture(s) and/or sign(s) can be provided over a network by a mixed-reality device worn by the first user and presented to the second user (e.g., in physical proximity to first user or at a physically remote location) by a mixed-reality device worn by the second user, a display local to the second user and/or a speaker system local to the second user.

Optionally, the system 100 can include a feedback component 150 that adapts the model 130 based upon user feedback. In some embodiments, the user feedback is received from the gesturing/signing user.

In some embodiments, the user feedback is received from a user that received the information regarding the interpreted gesture(s) and/or sign(s). In some embodiments, the user feedback is received in real-time. In some embodiments, the user feedback is received offline subsequent to a communication interaction. For example, the user forming the gesture(s) and/or sign(s) can review a text transcript or audio file provided by the output component 140 and provide user feedback (e.g., correcting any interpretation anomalies).

Figure 2:
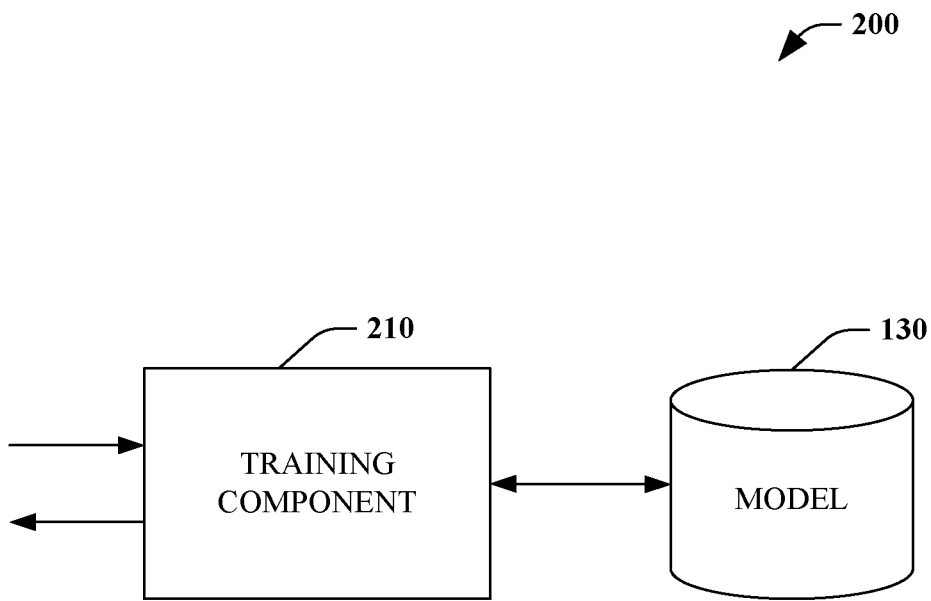
FIG. 2 is a functional block diagram that illustrates a system for training/testing a model.

Turning to FIG. 2, a system for training/testing a model 200 is illustrated. The system 200 includes a training component 210 that trains the model 130. Training can be performed in a supervised, unsupervised and/or semi-supervised manner. Information regarding the interpreted gesture and/or sign using the model 130 can be compared with the actual (e.g., observed) with the model 130 adjusted accordingly.

In some embodiments, the model 130 can be a classifier trained over a particular sign language. For example, the particular sign language can be comprised of individual gestures, individual signs, sequence of gestures and/or sequence of signs, and/or combinations thereof with each individual gesture, individual sign, sequence, and/or combination assigned as a class. Using supervised training, the model 130 can be trained (and tested) to recognize each of the individual gestures, signs, sequences, and/or combination using the training component 210.

For example, a human trainer can provide a sequence of hand gestures along with an intended meaning of the sequence to the training component 210. The training component 210 can adjust the model 130 to recognize the sequence as having the intended meaning. In some embodiments, the training and/or testing can be performed repetitively until the model 130 successfully interprets each of the individual gestures, individual signs, sequence of gestures, and/or sequence signs, and/or combinations of the particular sign language.

In some embodiments, the training component 210 can further train the model 130 to translate the interpreted gesture(s) and/or sign(s) to one or more spoken and/or written target languages (e.g., English, Spanish) using the model 130. For example, the interpretation component 120 can map interpreted gesture(s) and/or sign(s) to word(s), phrase(s), and/or sentence(s) in the target language(s).

In some embodiments, once the model 130 is trained to interpret a particular language, as discussed above, the model 130 can be further trained to recognize gesture(s), sign(s), sequence of gestures, and/or sequence of signs of particular user(s). For example, a particular user can provide a series of hand gestures, signs, sequence of gestures and/or sequence of signs, and/or combinations. For each of the series, the system 200 can provide an interpretation which the particular user can to form feedback regarding the actual intended meaning to the training component 210 which can be used adapt the model 130.

In some embodiments, the model 130 is trained to recognize each of the individual gestures, signs, sequences, and/or combination from the perspective of the second user observing the gestures, signs, sequences, and/or combination (e.g., model 130 local to mixed reality device worn by second user). In some embodiments, the model 130 is trained to recognize each of the individual gestures, signs, sequences, and/or combination from the perspective of the first user transmitting the gestures, signs, sequences, and/or combination (e.g., model 130 local to mixed reality device worn by first user).

Figure 3:
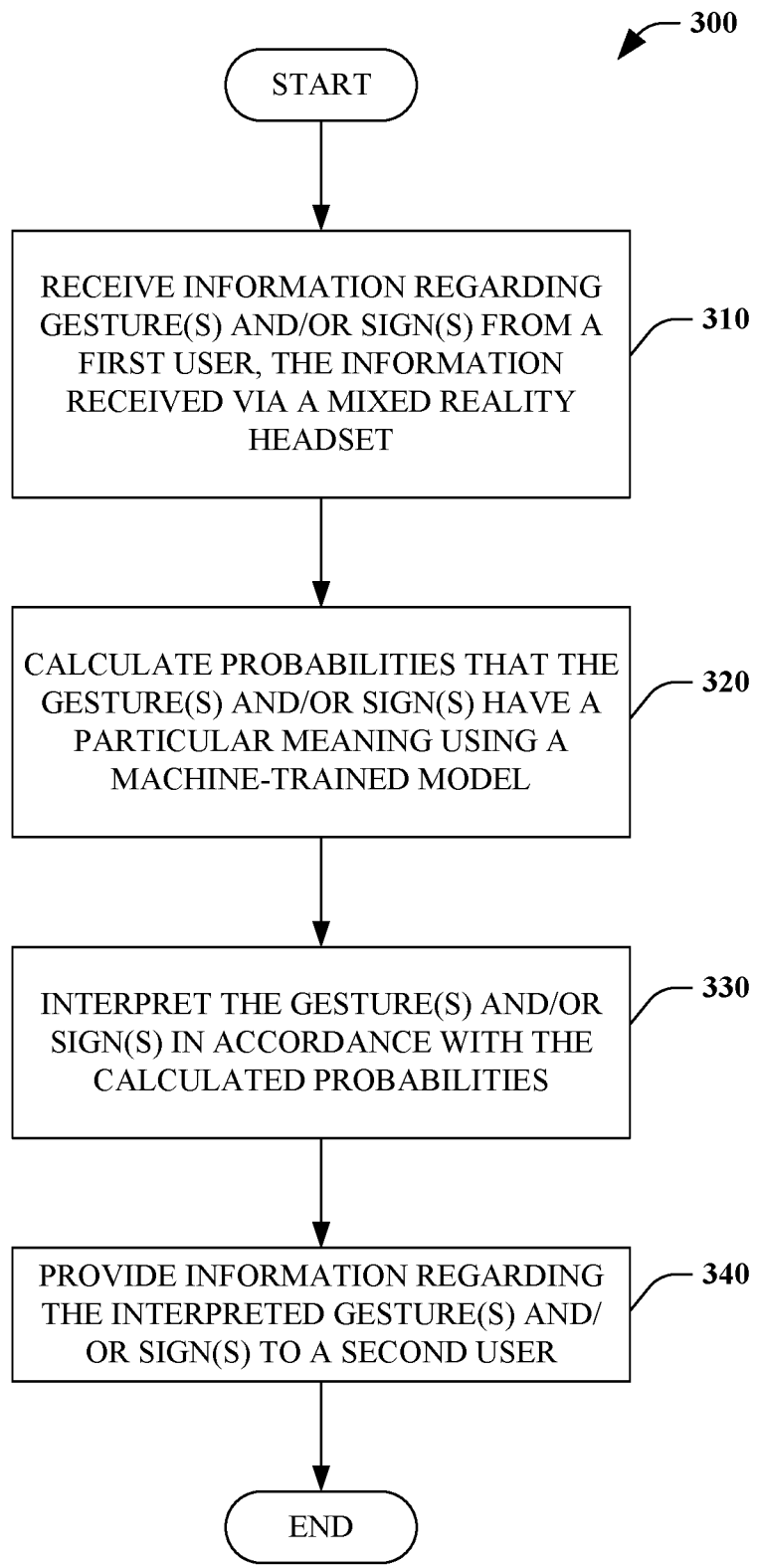
FIG. 3 is a flow chart that illustrates a method of interpreting gesture(s) and/or sign(s) using a machine-learned model.
Figure 4:
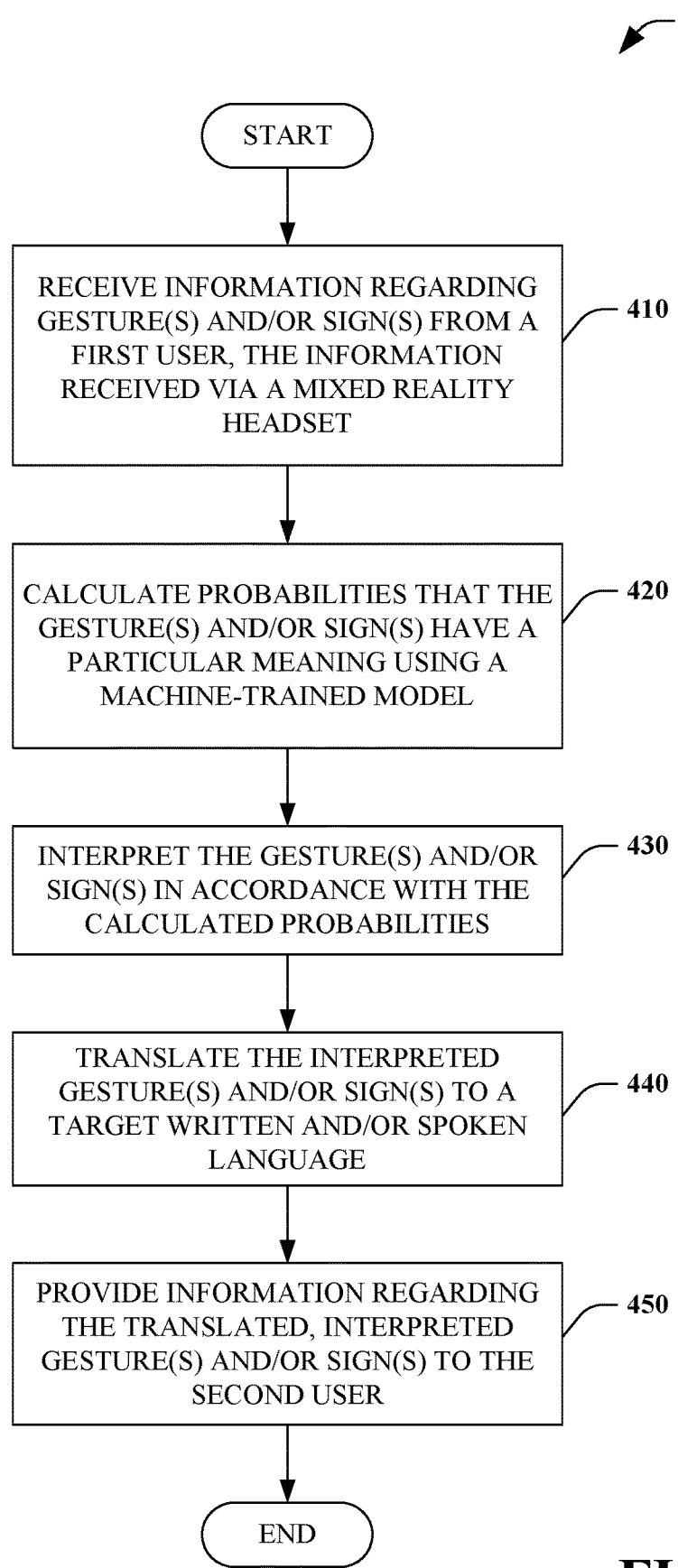
FIG. 4 is a flow chart that illustrates another method of interpreting gesture(s) and/or sign(s) using a machine-learned model.
Figure 5:
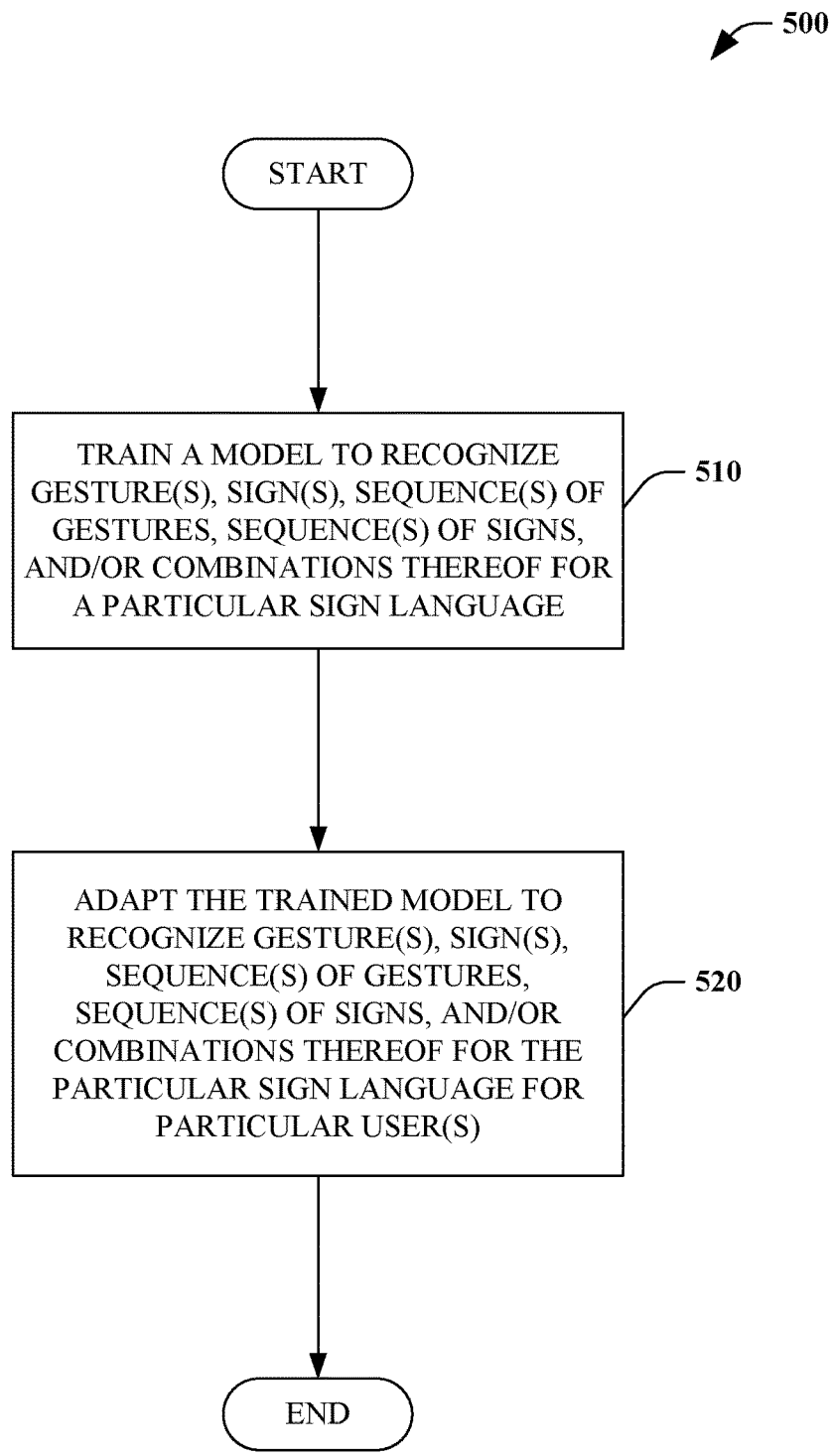
FIG. 5 is a flow chart that illustrates a method of training a machine-learned model.

FIGS. 3-5 illustrate exemplary methodologies relating to interpreting gesture(s) and/or sign(s) using a machine-learned model. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring to FIG. 3, a method of interpreting gesture(s) and/or sign(s) using a machine-learned model 400 is illustrated. In some embodiments, the method 300 is performed by the system 100.

At 310, information regarding gesture(s) and/or sign(s) is received from a first user. The information is received via a mixed reality device (e.g., of the first user and/or of a second user observing the gesture(s) and/or sign(s) of the first user) and/or an augmented reality device. At 320, probabilities are calculated that the gesture(s) and/or sign(s) have a particular meaning using a machine-trained model. At 330, the gesture(s) and/or sign(s) are interpreted in accordance with the calculated probabilities. At 340, information regarding the interpreted gesture(s) and/or sign(s) is provided to the second user (e.g., via the mixed reality device).

Turning to FIG. 4, a method of interpreting gesture(s) and/or sign(s) using a machine-learned model 400 is illustrated. In some embodiments, the method 300 is performed by the system 100.

At 410, information regarding gesture(s) and/or sign(s) is received from a first user. The information is received via a mixed reality device (e.g., of the first user and/or of a second user observing the gesture(s) and/or sign(s) of the first user). At 420, probabilities are calculated that the gesture(s) and/or sign(s) have a particular meaning using a machine-trained model. At 430, the gesture(s) and/or sign(s) are interpreted in accordance with the calculated probabilities.

At 440, the interpreted gesture(s) and/or sign(s) are translated into a target written and/or spoken language. At 450, information regarding the interpreted gesture(s) and/or sign(s) is provided to the second user (e.g., via the mixed reality device).

Next, referring to FIG. 5, a method of training a machine-learned model 500 is illustrated. In some embodiments, the method 500 is performed by the system 200.

At 510, a model is trained to recognize gesture(s), sign(s), sequence(s) of gestures, sequence(s) of signs, and/or combination thereof for a particular sign language. At 520, the trained model is adapted to recognize gesture(s), sign(s), sequence(s) of gestures, sequence(s) of signs, and/or combination thereof for the particular language for particular user(s).

Described herein is a system for interpreting a gesture or a sign using a machine-learned model, comprising: a computer comprising a processor and a memory having computer-executable instructions stored thereupon which, when executed by the processor, cause the computer to: receive information regarding at least one of a gesture or a sign from a first user, the information received via a mixed reality device; calculate probabilities that the at least one of the gesture or the sign has particular meanings using a machine-trained model; interpret the at least one of the gesture or the sign in accordance with the calculated probabilities; and provide information regarding the interpreted at least one of the gesture or the sign to a second user.

The system can include wherein the information regarding the interpreted at least one of the gesture or the sign is provided as displayed text to the second user. The system can further include wherein the information regarding the interpreted at least one of the gesture or the sign is provided audibly to the second user. The system can include wherein the memory has further computer-executable instructions stored thereupon which, when executed by the processor, cause the computer to: translate the interpreted at least one of the gesture or the sign to a target written language; and providing information regarding the translated, interpreted at least one of the gesture or the sign to the second user.

The system can further include wherein the machine-trained model comprises a classifier trained to recognize at least one of gestures, signs, sequences of hand gestures or sequences of signs of a particular sign language. The system can include wherein the machine-trained model is trained using a cluster algorithm in an unsupervised environment. The system can further include wherein interpret the at least one of the gesture or the sign by calculating probabilities is performed based upon a previously received gesture or sign.

The system can include wherein interpret the at least one of the gesture or the sign by calculating probabilities is performed based upon a subsequently received gesture or sign. The system can further include comprise the mixed reality device. The system can include wherein the machine-trained model is trained to recognize gestures or signs of a particular user for a particular sign language.

The system can include wherein the memory has further computer-executable instructions stored thereupon which, when executed by the processor, cause the computer to: provide information regarding the interpreted at least one of the gesture or the sign to the first user; receive feedback from the first user regarding the interpreted at least one of the gesture or the sign; and update the machine-learned model in accordance with the feedback received from the first user.

Described herein is a method of interpreting a gesture or a sign using a machine-learned model, comprising: receiving information regarding at least one of a gesture or a sign from a first user, the information received via a mixed reality device; calculating probabilities that the at least one of the gesture or the sign has particular meanings using a machine-trained model; interpreting the at least one of the gesture or the sign in accordance with the calculated probabilities; and providing information regarding the interpreted at least one of the gesture or the sign to a second user.

The method can include wherein the information regarding the interpreted at least one of the gesture or the sign is provided as displayed text to the second user. The method can further include wherein the information regarding the interpreted at least one of the gesture or the sign is provided audibly to the second user. The method can include translating the interpreted at least one of the gesture or the sign to a target written language; and providing information regarding the translated, interpreted at least one of the gesture or the sign to the second user.

The method can further include wherein the machine-trained model is trained using a cluster algorithm in an unsupervised environment. The method can include wherein interpret the at least one of the gesture or the sign by calculating probabilities is performed based upon at least one of a previously received gesture, a previously received sign, a subsequently received gesture, or a subsequently received sign. The method can further include wherein the machine-trained model is trained to recognize gestures or signs of a particular user for a particular sign language.

Described herein is a computer storage media storing computer-readable instructions that when executed cause a computing device to: receive information regarding at least one of a gesture or a sign from a first user, the information received via a mixed reality device; calculate probabilities that the at least one of the gesture or the sign has particular meanings using a machine-trained model; interpret the at least one of the gesture or the sign in accordance with the calculated probabilities; and provide information regarding the interpreted at least one of the gesture or the sign to a second user. The computer storage media can include storing further computer-readable instructions that when executed cause a computing device to: translate the interpreted at least one of the gesture or the sign to a target written language; and provide information regarding the translated, interpreted at least one of the gesture or the sign to the second user.

Figure 6:
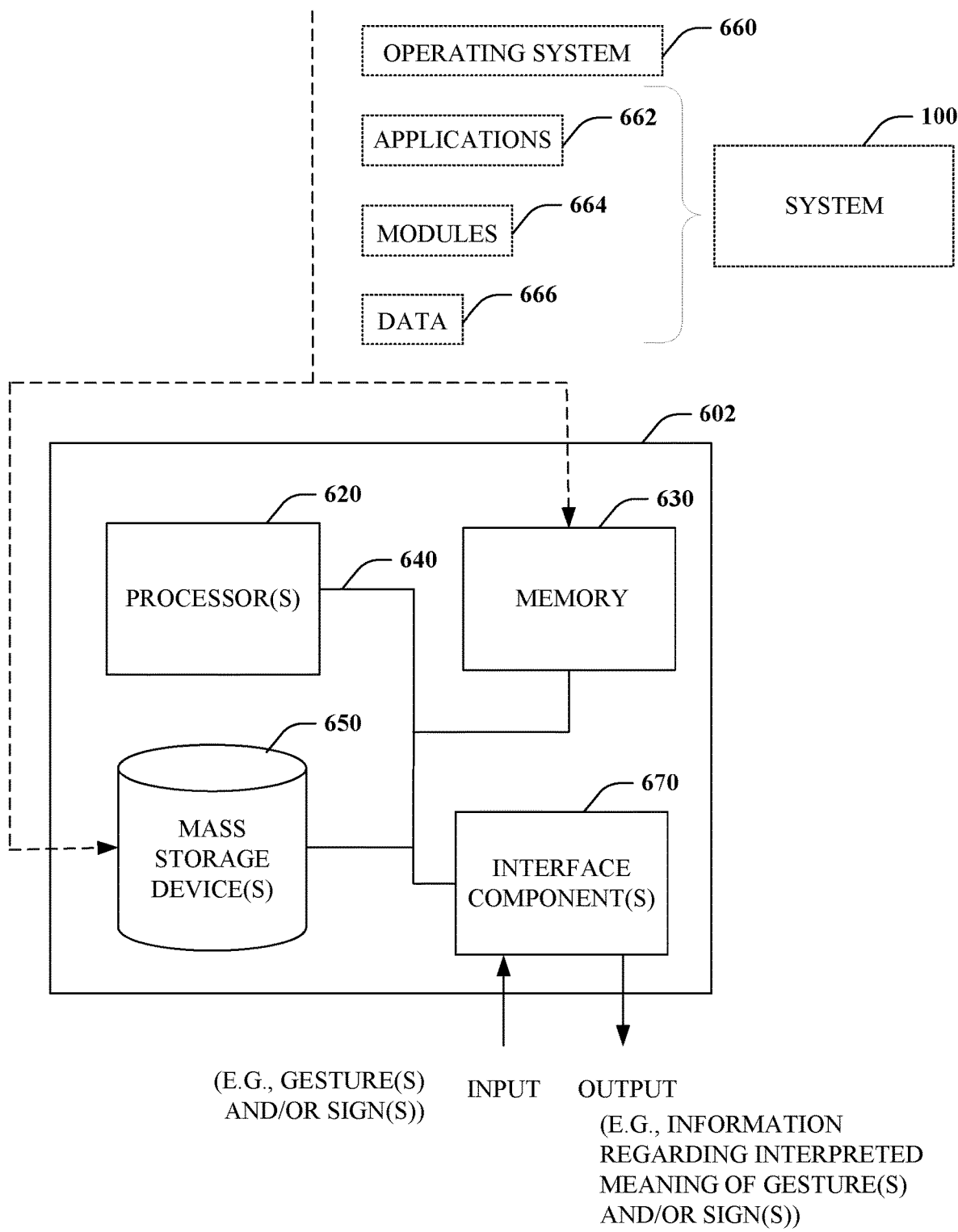
FIG. 6 is a functional block diagram that illustrates an exemplary computing system.

With reference to FIG. 6, illustrated is an example general-purpose computer or computing device 602 (e.g., mobile phone, desktop, laptop, tablet, watch, server, hand-held, programmable consumer or industrial electronics, set-top box, game system, compute node, etc.). For instance, the computing device 602 may be used in a system for interpreting gesture(s) and/or sign(s) using a machine-learned model.

The computer 602 includes one or more processor(s) 620, memory 630, system bus 640, mass storage device(s) 650, and one or more interface components 670. The system bus 640 communicatively couples at least the above system constituents. However, it is to be appreciated that in its simplest form the computer 602 can include one or more processors 620 coupled to memory 630 that execute various computer executable actions, instructions, and or components stored in memory 630. The instructions may be, for instance, instructions for implementing functionality described as being carried out by one or more components discussed above or instructions for implementing one or more of the methods described above.

The processor(s) 620 can be implemented with a general purpose processor, a tensor processing unit (TPU), a graphics processing unit (GPU), a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 620 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 620 can be a graphics processor.

The computer 602 can include or otherwise interact with a variety of computer-readable media to facilitate control of the computer 602 to implement one or more aspects of the claimed subject matter. The computer-readable media can be any available media that can be accessed by the computer 602 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM), etc.), magnetic storage devices (e.g., hard disk, floppy disk, cassettes, tape, etc.), optical disks (e.g., compact disk (CD), digital versatile disk (DVD), etc.), and solid state devices (e.g., solid state drive (SSD), flash memory drive (e.g., card, stick, key drive) etc.), or any other like mediums that store, as opposed to transmit or communicate, the desired information accessible by the computer 602. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 630 and mass storage device(s) 650 are examples of computer-readable storage media. Depending on the exact configuration and type of computing device, memory 630 may be volatile (e.g., RAM), non-volatile (e.g., ROM, flash memory, etc.) or some combination of the two. By way of example, the basic input/output system (BIOS), including basic routines to transfer information between elements within the computer 602, such as during start-up, can be stored in nonvolatile memory, while volatile memory can act as external cache memory to facilitate processing by the processor(s) 620, among other things.

Mass storage device(s) 650 includes removable/non-removable, volatile/non-volatile computer storage media for storage of large amounts of data relative to the memory 630. For example, mass storage device(s) 650 includes, but is not limited to, one or more devices such as a magnetic or optical disk drive, floppy disk drive, flash memory, solid-state drive, or memory stick.

Memory 630 and mass storage device(s) 650 can include, or have stored therein, operating system 660, one or more applications 662, one or more program modules 664, and data 666. The operating system 660 acts to control and allocate resources of the computer 602. Applications 662 include one or both of system and application software and can exploit management of resources by the operating system 660 through program modules 664 and data 666 stored in memory 630 and/or mass storage device (s) 650 to perform one or more actions. Accordingly, applications 662 can turn a general-purpose computer 602 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, system 100 or portions thereof, can be, or form part, of an application 662, and include one or more modules 664 and data 666 stored in memory and/or mass storage device (s) 650 whose functionality can be realized when executed by one or more processor(s) 620.

In accordance with one particular embodiment, the processor(s) 620 can correspond to a system on a chip (SOC) or like architecture including, or in other words integrating, both hardware and software on a single integrated circuit substrate. Here, the processor(s) 620 can include one or more processors as well as memory at least similar to processor(s) 620 and memory 630, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system 100 and/or associated functionality can be embedded within hardware in a SOC architecture.

The computer 602 also includes one or more interface components 670 that are communicatively coupled to the system bus 640 and facilitate interaction with the computer 602. By way of example, the interface component 670 can be a port (e.g., serial, parallel, PCMCIA, USB, FireWire, etc.) or an interface card (e.g., sound, video, etc.) or the like. In one example implementation, the interface component 670 can be embodied as a user input/output interface to enable a user to enter commands and information into the computer 602, for instance by way of one or more gestures or voice input, through one or more input devices (e.g., pointing device such as a mouse, trackball, stylus, touch pad, keyboard, microphone, joystick, game pad, satellite dish, scanner, camera, other computer, etc.). In another example implementation, the interface component 670 can be embodied as an output peripheral interface to supply output to displays (e.g., LCD, LED, plasma, etc.), speakers, printers, and/or other computers, among other things. Still further yet, the interface component 670 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system comprising:
a processor; and
a memory having computer-executable instructions stored thereupon which, when executed by the processor, cause the system to:
receive information regarding a sequence of gestures or signs from a first user, the information received via a mixed reality device, the sequence including a first gesture or sign and a second gesture or sign, wherein the first gesture or sign occurs in the sequence before the second gesture or sign;
calculate probabilities that the second gesture or sign has particular meanings using a machine-trained model, the probabilities being based at least on the first gesture or sign that occurs in the sequence before the second gesture or sign;
interpret the second gesture or the sign in accordance with the calculated probabilities; and
provide information regarding the interpreted second gesture or sign to a second user.

2. The system of claim 1, wherein the information regarding the interpreted second gesture or sign is provided as displayed text to the second user.

3. The system of claim 1, wherein the information regarding the interpreted second gesture or sign is provided audibly to the second user.

4. The system of claim 1, wherein the memory has further computer-executable instructions stored thereupon which, when executed by the processor, cause the system to:
translate the interpreted second gesture or sign to a target written language; and
provide information regarding the translated, interpreted second gesture or sign to the second user.

5. The system of claim 1, wherein the machine-trained model comprises a classifier trained to recognize at least one of a plurality of gestures or signs of a particular sign language.

6. The system of claim 1, wherein the machine-trained model is trained using a cluster algorithm in an unsupervised environment.

7. The system of claim 1, wherein the memory has further computer-executable instructions stored thereupon which, when executed by the processor, cause the system to:
calculate the probabilities that the second gesture or sign has the particular meanings based at least on a third gesture or sign that occurs in the sequence after the second gesture or sign.

8. The system of claim 1, wherein the memory has further computer-executable instructions stored thereupon which, when executed by the processor, cause the system to:
buffer the sequence of gestures or signs;
using the machine-trained model, calculate respective probabilities for each gesture or sign in the sequence;
interpret each gesture or sign in the sequence based at least on the respective probabilities; and
provide respective information regarding each interpreted gesture or sign in the sequence.

9. The system of claim 1, further comprising the mixed reality device.

10. The system of claim 1, wherein the machine-trained model is trained to recognize gestures or signs of a particular user for a particular sign language.

11. The system of claim 1, wherein the memory has further computer-executable instructions stored thereupon which, when executed by the processor, cause the system to:
provide information regarding the interpreted second gesture or sign to the first user;
receive feedback from the first user regarding the interpreted second gesture or sign; and
update the machine-trained model in accordance with the feedback received from the first user.

12. The system of claim 1, wherein the first gesture or sign and the second gesture or sign are from American Sign Language.

13. A method comprising:
receiving information regarding a sequence of gestures or signs from a first user, the information received via a mixed reality device, the sequence including a first gesture or sign and a second gesture or sign, wherein the first gesture or sign occurs in the sequence before the second gesture or sign;
based at least on the first gesture or sign, calculating probabilities that the second gesture or sign has particular meanings using a machine-trained model;
interpreting the second gesture or the sign in accordance with the calculated probabilities; and
providing information regarding the interpreted second gesture or sign to a second user.

14. The method of claim 13, wherein the information regarding the interpreted second gesture or sign is provided audibly to the second user.

15. The method of claim 13, further comprising:
translating the interpreted second gesture or sign to a target written language; and
providing information regarding the translated, interpreted second gesture or sign to the second user.

16. The method of claim 13, wherein the machine-trained model is trained using a cluster algorithm in an unsupervised environment.

17. The method of claim 13, wherein the information regarding the interpreted second gesture or sign is provided as displayed text to the second user.

18. The method of claim 13, wherein the machine-trained model is trained to recognize gestures or signs of a particular user for a particular sign language.

19. A computer storage media storing computer-readable instructions that, when executed, cause a computing device to:
receive information regarding a particular gesture or sign from a first user, the information received via a mixed reality device, wherein at least one other gesture or sign is received sequentially with the particular gesture or sign;
calculate probabilities that the particular gesture or sign has particular meanings using a machine-trained model based at least on the at least one other gesture or sign received sequentially with the particular gesture or sign;
interpret the particular gesture or sign in accordance with the calculated probabilities; and
output information regarding the interpreted particular gesture or sign.

20. The computer storage media of claim 19, storing further computer-readable instructions that, when executed, cause a computing device to:
- translate the interpreted particular gesture or the sign to a target written language; and
- provide information regarding the translated, interpreted particular gesture or sign to a second user.

* * * * *